United States Patent
Becker et al.

(10) Patent No.: US 6,749,169 B2
(45) Date of Patent: Jun. 15, 2004

(54) SEAT FRAME OF A VEHICLE SEAT WITH A SEAT CARRIER AND FRONT PARALLELOGRAM ARMS

(75) Inventors: Burkhard Becker, Solingen (DE); Michael Leng, Solingen (DE); Axel Poley, Düsseldorf (DE); Wilfried Beneker, Leichlingen (DE)

(73) Assignee: C. Rob. Hammerstein GmbH & Co. KG (DE)

( * ) Notice: Subject to any disclaimer, the term of this patent is extended or adjusted under 35 U.S.C. 154(b) by 0 days.

(21) Appl. No.: 10/222,325

(22) Filed: Aug. 15, 2002

(65) Prior Publication Data

US 2003/0047975 A1 Mar. 13, 2003

(30) Foreign Application Priority Data

Sep. 10, 2001 (DE) ......................... 101 44 452
Sep. 27, 2001 (DE) ......................... 101 47 800

(51) Int. Cl.[7] ............................................. F16M 13/00
(52) U.S. Cl. ................................. 248/421; 248/422
(58) Field of Search ....................... 248/157, 419, 248/420, 421, 422, 424

(56) References Cited

U.S. PATENT DOCUMENTS

| | | | | |
|---|---|---|---|---|
| 3,049,330 A | * | 8/1962 | Coons et al. | 248/419 |
| 3,460,793 A | * | 8/1969 | Posh | 248/394 |
| 4,190,225 A | * | 2/1980 | Bauer et al. | 248/394 |
| 4,222,543 A | * | 9/1980 | Gedig et al. | 248/394 |
| 4,487,390 A | * | 12/1984 | Miyashita | 248/396 |
| 4,556,185 A | * | 12/1985 | Takagi | 248/421 |
| 4,948,081 A | * | 8/1990 | Hatta | 248/396 |
| 5,568,908 A | * | 10/1996 | Kisiel | 248/419 |
| 5,765,840 A | * | 6/1998 | Tame | 297/330 |
| 5,882,061 A | * | 3/1999 | Guillouet | 296/65.05 |
| 6,264,274 B1 | | 7/2001 | Frohnhaus et al. | |
| 6,464,193 B1 | * | 10/2002 | Nemoto | 248/421 |
| 6,502,798 B1 | * | 1/2003 | Frohnhaus et al. | 248/422 |

* cited by examiner

Primary Examiner—Ramon O. Ramirez
Assistant Examiner—Amy J. Sterling
(74) Attorney, Agent, or Firm—Akerman Senterfitt

(57) ABSTRACT

The seat frame can either come with a height adjustment device of the seat frontal edge or not. Its seat carrier has at least one side part, one front arm means and one longitudinal adjustment device. The side part is provided with a first bore and a second bore. The front arm means is either realized by a parallelogram arm or a pair of arm means. The parallelogram arm has a first bearing member cooperating with the first bore. The pair of arm means is composed of an upper arm and a lower arm and a device for adjusting the angular position of the upper arm relative to the seat carrier. The upper arm is provided with a second bearing member which is spaced from the common joint and cooperates with the second bore. Both arms are pivotally joined together in a common joint. The lower arm shows a distance between the common joint and the bearing means, which is substantially of the same length as the distance realized by the parallelogram arm and measured between the first bearing member and the lower pivot joint.

13 Claims, 1 Drawing Sheet

SEAT FRAME OF A VEHICLE SEAT WITH A SEAT CARRIER AND FRONT PARALLELOGRAM ARMS

Figure 1:
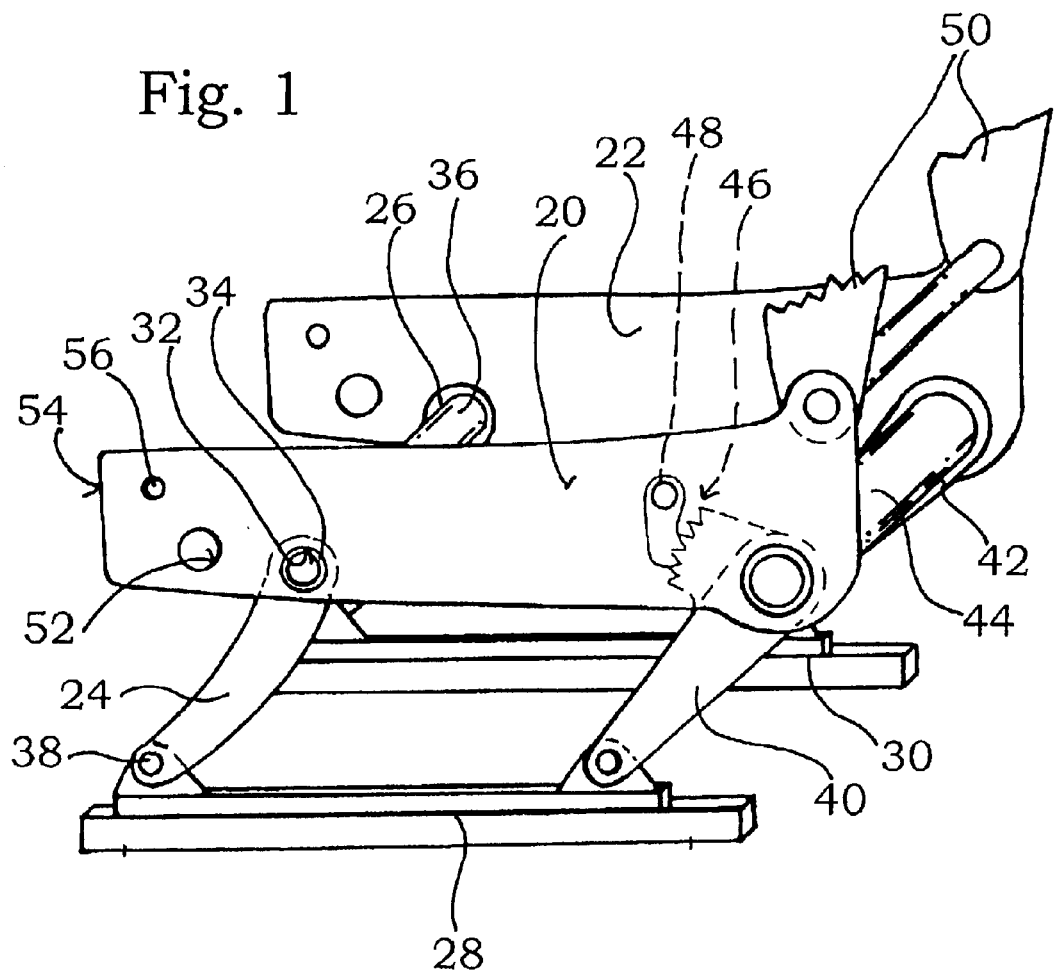

The invention relates to a seat frame of a vehicle seat with a seat carrier having at least one side part, with a front arm means and with a longitudinal adjustment device, the side part being provided with a first bore and a bearing member, more specifically a bolt or a shaft, projecting from the front arm means and passing through said first bore so that an upper pivot joint is realized between the side part and the front arm means with the front arm means being connected to the longitudinal adjustment device by way of a lower pivot joint.

Seat frames of this type have come to be widely used, U.S. Pat. No. 6,264,274 B1 being cited herein as a mere example of the state of the art. Usually, the side part of the seat carrier is hinge-linked, in the rear region thereof, to the pair of rails of the longitudinal adjustment device by way of a rear swiveling support. A four-bar linkage is thus obtained which is composed of the side part, the front parallelogram arm, the seat rail of the pair of rails and the rear swiveling support. An adjustment member is allocated to this four-bar linkage, said adjustment member being situated in most cases at the hinge point between the rear swiveling support and the side part. By releasing it, the seat carrier may be adjusted in height relative to the longitudinal adjustment device.

Many users not only ask for height adjustment but also for inclination adjustment of the seat carrier relative to the longitudinal adjustment device. Such adjustment devices are conventional in the art. The height of the front edge of the seat carrier is adjusted, the rear region of the seat carrier substantially remains at the same height.

It is well known to provide the front parallelogram arm with a variable length for the purpose of achieving such an adjustment of the inclination. Seat frames are known in which the front parallelogram arm is realized by a pair of arms consisting of an upper and of a lower arm that are pivotally joined together in one common joint. By varying the angle formed by said two arms, the height of the front edge of the seat may be adjusted. A device for adjusting the angular position of the upper arm relative to the seat carrier is provided for this purpose.

Whereas the seat frame of the type mentioned herein above has four links, i.e., is a so-called four-link arrangement, the seat frame provided with a possibility of adjusting the height of the front edge of the seat is a five-link arrangement. The latter seat frame is more complex than the seat frame of the type mentioned herein above since it requires more parts, for example, an adjustment device with hand or motor drive.

In manufacturing seat frames for vehicle seats, is an aim to produce seats with height adjustment only and to include additional inclination adjustment in a simple manner in an effort to permit low-cost manufacturing of the two configuration alternatives for the seat frame. This is where the invention comes to bear. It is the object of the invention to improve a seat frame of the type mentioned herein above in such a manner that, for both alternatives, i.e., a seat frame of adjustable height but not of adjustable inclination on the one hand and a seat frame of adjustable height and inclination on the other hand, as many like parts as possible may be used, that, for both alternatives, the kinematics in the region of adjustment of the height adjustment may be almost identical and the production simple.

In view of the seat frame of the type mentioned herein above, the solution to this object is to provide the side part with an additional, second bore, to provide, alternatively, either a parallelogram arm or a pair of arm means comprising an upper arm, a lower arm, and a device for adjusting the angular position. Both arms are pivotally joined together in one common joint. The upper arm has a pivot member which is spaced from the common joint and by means of which it can be carried in the second bore. The device for adjusting the angular position adjusts the angular position of the upper arm relative to the seat carrier. The axis of the common joint is substantially aligned with the first bore in a certain position of adjustment of said device. The lower arm has bearing means and is hingeable to the longitudinal adjustment device and is provided, between the two hinge points thereof, with substantially the same length the parallelogram arm shows with between the hinge point of its bolt, i.e., the upper pivot joint, and the lower pivot joint.

In accordance with the invention, the same seat carrier may be used for the two alternative embodiments of the seat frame. Thanks to their two bores, the seat carriers are designed in such a manner that they may be connected either with one parallelogram arm, or with the upper arm of a pair of arm means.

The kinematics of the height adjustment device is very similar in the two alternatives. If the device for adjusting the inclination of the seat frame of adjustable inclination is set in such a manner that the axis of the common joint is aligned with the first bore, the kinematics of the height adjustment of the thus set seat of adjustable inclination is the same as the kinematics of the height adjustment of the other alternative, i.e., of the seat frame the inclination of which cannot be adjusted. The length of the upper double arm between the two hinge points thereof substantially squares with the distance between the two bores of the side part.

Generally speaking, the invention makes it possible to provide a seat frame of simple construction that is manufactured in two alternatives, the one with and the other one without inclination adjustment. All of the other parts of the vehicle seat can remain unchanged. It is only necessary to provide enough space for handling the adjustment device when it is driven manually, which may be in the form of an opening for the axle of such an adjustment device. If the adjustment device is electrical, space is provided for the drive anyway.

In a development of the invention, the seat carrier is provided, in a manner well known in the art, with a left and a right side part, a left and a right front parallelogram arm and two pairs of rails of the longitudinal adjustment in the first alternative. In the (second) alternative, with adjustable inclination, two pairs of arm means are substituted for the two front parallelogram arms. It is thereby possible, but not necessary, to provide an adjustment device on either side of the seat.

The two front parallelogram arms, or, in the case of the alternative embodiment, the two pairs of arm means, are preferably joined together by means of a tie bar. As a result thereof, the whole seat frame is stiffer end a lateral displacement or inclination is prevented. It is made certain that the two front parallelogram arms, or the pairs of arm means, are always substantially paralleled.

In a preferred development, the second bore is nearer a front edge of the seat than the first bore. As a result thereof, the required adjustment device may be realized in relative proximity to the front edge of the seat, thus being conveniently within reach for manual drive. In principle, the second bore may also be provided at a greater distance from the front edge of the seat than the first bore.

In a preferred embodiment, the two bores are provided at the same distance from the associated pair of rails of the longitudinal adjustment device. Put another way, a connecting line of the two bores is oriented substantially parallel to a longitudinal dimension of the side part. Preferably, the two bores and one hinge axle of the rear swiveling support of the side part are substantially aligned.

In a development, the already mentioned, certain or determined position of adjustment of the adjustment device, in which the common joint is substantially aligned with the first bore, is situated in a region that extends from the central position of the adjustment device toward a lower setting of the front edge of the seat. This means that, in the first alternative of the seat frame without inclination adjustment, the front edge of the seat is actually too low for a standard passenger. In the alternative with inclination adjustment, the front edge of the seat can be raised by a greater distance than it can be lowered as compared to the first alternative.

Further advantages and characteristics of the invention will become apparent in the claims and in the following description of an exemplary embodiment that is not limiting the scope of the invention and is explained in more detail with reference to the drawing.

Figure 2:
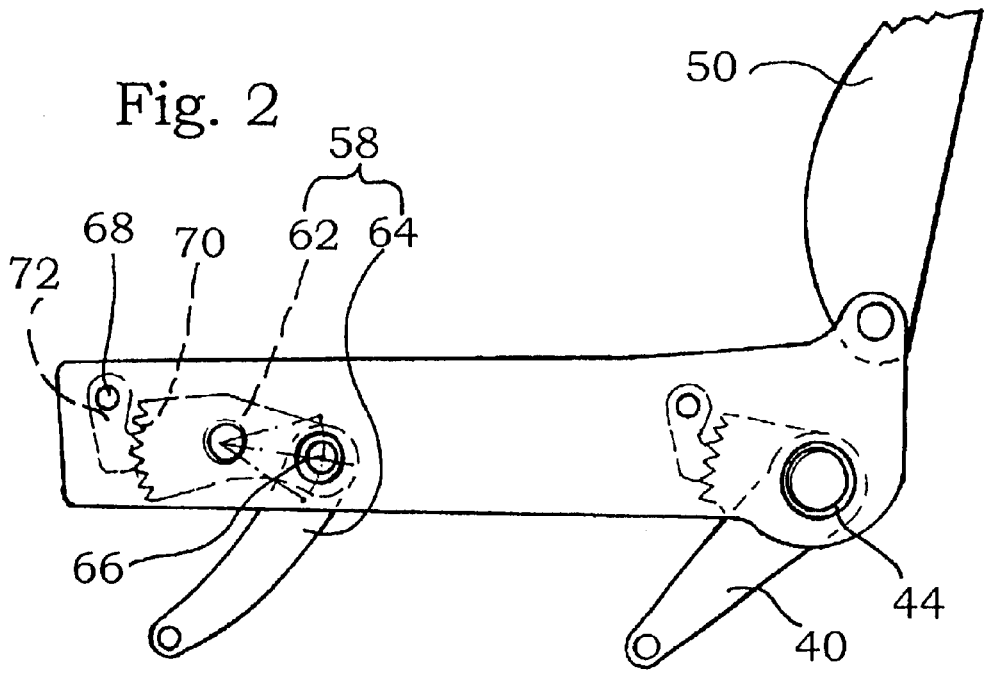

FIG. 1 is a perspective view of a seat frame in a first alternative without inclination adjustment, i.e., in the form of a four-bar linkage provided on either side of the seat and FIG. 2 is a side view of a seat frame in the other (second) alternative, i.e., with inclination adjustment.

FIG. 1 shows the seat frame of a vehicle seat in a first alternative. A seat carrier, which is provided with a left side part 20 and a right side part 22, is connected to a longitudinal adjustment device via two front parallelogram arms, i.e., a left front parallelogram arm 24 and a right front parallelogram arm 26, said longitudinal adjustment device having a left pair of rails 28 and a right pair of rails 30. A first bore 32 is provided in each side part 23, 22. The two front parallelogram arms 24, 26 have a first bearing member 34 each, said bearing member being configured as an axial stud which is carried in the first bore 32. Said axial stud 34 is formed by end regions of a tie bar 36 by way of which the upper ends of the front parallelogram arms 24, 26 are rigidly joined together. The end regions of the tie bar 36, project laterally beyond the arms 24, 26 and form the axle studs 34. The described hinge connection between the upper ends of the front parallelogram arms 24, 26 and the first bore 32 in the respective one of the side parts 20, 22 is called the upper pivot joint.

The configuration of said upper pivot joint is discretionary in principle. A similar embodiment is obtained when, instead of the first bearing member 34, a first pin projects transversely from the side part 20,22. In this configuration, the parallelogram arms 24,26 have a hole, through which the pin passes. Said hole may also be formed by the interior space of the tie bar 36. In principle, the bearing mans needs not be connected to a parallelogram arm 24, 26 or to the associated side part 20, 22. The bearing member may also be configured separately.

At their lower end, the parallelogram arms 24, 26 have bearing means and are hinged to a respective one of the seat rails of the associated pair of rails 28, 30. This hinge region is called the lower pivot joint 38.

In the rear region, each side part 20, 22 is supported by a swiveling support, a left swiveling support 40 and a right swiveling support 42 being provided. Said swiveling supports are also called rear swiveling supports. An adjustment device 46 is configured on one seat side, here the left one. In this specific case, it has a sector gear, which is connected to the associated left swiveling support 40 and which is centered on the upper pivot joint, i.e., on the axle of the transverse shaft 44. A locking jaw 48, which is hinged to the left side part 20 in such a manner that it is pivotal about an axis, is allocated thereto. The upper joint is locked in this way. A prior art mechanical or motor-driven adjustment drive unit, which has not been illustrated herein, may be provided for drive.

At their respective lower ends, the two swiveling supports 40, 42 are pivotally connected, in a lower joint, to the seat rail of the corresponding pair of rails 28, 30. A four-bar linkage is thus formed, which is composed, for the left side, of the following four link members:

left side part 20, left front parallelogram arm 24, seat rail of the left pair of rails 28 and left swiveling support 40.

In the upper rear region of the two side parts 20, 22 there is also arranged a backrest, with the bearers 50 of a backrest, which are joined together in such a manner that they are rotatable about an axis, being shown.

Each side part 20, 22 also has a second bore 52, which is displaced so as to be nearer a front edge 54 than the first bore 32. The center points of the second bore 52, the first bore 32 and the upper pivoting point of the swiveling support 40 and 42 respectively are aligned in a substantially straight line. Finally, a pivot bearing member or bearing member means 56 is provided, which is located diagonally viz. obliquely above the second bore 52 and is realized, in the embodiment shown, as a hole or a bore. A similar embodiment is obtained when it is configured as a bearing pin. The mentioned second bore 52 and said pivot bearing member 56 will be discussed hereinafter:

Alternatively, instead of the embodiment with height adjustment of the seat carrier as shown in FIG. 1, the seat frame may additionally be fitted with an inclination adjustment. Whereas FIG. 1 shows the so-called first alternative, FIG. 2 shows the second alternative for the seat frame, which is now provided with the additional inclination adjustment device. Only the front regions of the side parts 20, 22 differ in the two Figs., the rear region, i.e., the region of the swiveling supports 40, 42 and so on, remains unchanged.

To pass from the first to the second alternative, that is to say, to equip the seat frame with an additional inclination adjustment, two pair of arm means 58 are used instead of the two front parallelogram arms 24, 26 including an additional adjustment device 60.

Each pair of arm means 58 has an upper arm 02 and a lower arm 64. The two are hinge-linked together in one common joint having an axis. They are arranged so as to form "V". The upper arm 62 has a bearing part 68 that is spaced from the common joint 66, is configured here as a bolt and is adapted to the second bore 52 in such a manner that it may be pivotally carried therein. The concrete realization of the pivot joint between the upper arm 62 and the respective one of the side parts 20, 22 is discretional. The bearing part or second bearing member 68 may also be realized in another way than the one described, it may for example be configured as a bearing bore. A bearing bolt may pass through said bearing bore and second bore 52, or a bearing pin may be provided instead of the second bore 52. This information is meant to demonstrate that the concrete realization of the pivot joint between the upper arm 62 and the respective one of the side parts 20, 22 is discretional in just the same way as it has already been explained for the pivot connection between the parallelogram arm 24 or 26 and the associated side part 20,22.

In the embodiment illustrated herein, the upper arm 62 has a toothed quadrant 70 which is part of the adjustment device 60. It is centered on the axis of the second bore 52. A locking member 72, configured similar to the locking jaw 48 and pivotal about the pivot bearing member 56, is assigned thereto. A driving device, which has not been illustrated herein in closer detail and which may be motor-driven or manual, is also provided. Driving devices of this type are well known. The angular position of the upper arm 62 may be varied by varying the engagement between toothed quadrant 70 and locking member 72. As a result thereof, the position of the common joint 66 relative to the associated side part 20 or 22 changes.

At its lower end, the lower arm 64 has bearing means and is hinged to the seat rail of the associated pair of rails. This occurs at the same site at which the bearing means of the front parallelogram arm is normally hinged and preferably in the same way as well.

The lower arm 64 can be built according to the same principle as a front parallelogram arm 24 or 26. It is preferably provided with the same length. It may also be shorter or longer, though. The length of the upper arm 62 between the common joint 66 and the second bore 52 approximately equals and is preferably identical to the distance between the first bore 32 and the second bore 52.

In FIG. 2, the adjustment device 60 is shown in a position in which the common joint 68 is flush with the first bore 32 and covers it. In this position of the inclination adjustment, the kinematics of the height adjustment is similar to that in FIG. 1.

The two pairs of arms 58 of the seat frame are connected by means of a tie bar 36 or a similar means. In the embodiment illustrated in FIG. 2, said tie bar 36 is rotatably carried in the second bores 52 of each side part 20, 22. The lower arms 64 may also be connected by means of a tie bar 36, though, and it is also possible that a shaft rigidly joins the two common joints 66 together.

In the two Figs., the side parts 20, 22 are built according to the same principle. Geometrical differences between the two Figs., if any, are unintentional.

What is claimed is:

1. A seat frame for a vehicle seat comprising:

a longitudinal adjustment device;

a seat carrier having at least one side part, the side part being provided with a first bore and a second bore;

a front arm means having a first bearing member cooperating with one of the first bore and the second bore, an upper pivot joint being formed between the front arm means and the side part; and a lower pivot joint arranged between the longitudinal adjustment device and the front arm means, wherein the front arm means is either realized by a parallelogram arm or a pair of arm means, the parallelogram arm has a first bearing member cooperating with the first bore and further has a bearing means for being hingeable to the longitudinal adjustment device, the pair of arm means is composed of an upper arm and a lower arm and a device for adjusting the angular position of the upper arm relative to the seat carrier, both arms being pivotally joined together in a common joint having an axis, the upper arm being provided with a second bearing member which is spaced from the common joint and cooperates with the second bore, in one position of adjustment of the device for adjusting the angular position the axis of the common joint is substantially aligned with the first bore, the lower arm has a bearing means for being hingeable to the longitudinal adjustment device and the lower arm exhibiting a distance between the common joint and bearing means, which is substantially of the same length as the distance realized by the parallelogram arm and measured between the first bearing member and the lower pivot joint.

2. The seat frame of claim 1, wherein the seat carrier comprises:

a left and a right side part;

a left and a right front parallelogram arm; and a left and a right longitudinal adjustment device, wherein each side part is provided with a first bore and with a second bore and, alternatively, the seat frame may be fitted with either two parallelogram arms, or with two pair of arm means, each pair of arm means comprising a lower arm and an upper arm.

3. The seat frame of claim 2, wherein the two front parallelogram arms are joined together by a tie bar.

4. The seat frame of claim 2, wherein the adjustment device comprises:

an adjustment member provided only on one side of the seat; and a shaft that connecting the two upper arms.

5. The seat frame of claim 1, wherein the second bore is located nearer a front edge of the seat than the first bore.

6. The seat frame of claim 1, wherein the first bore and the second bore are each located at approximately the same distance from the longitudinal adjustment device.

7. The seat frame of claim 1, wherein the distance from the first bore to the second bore on the seat carrier corresponds to the distance between pivot axes of the upper arm.

8. The seat frame of claim 1, further comprising at least one rear swiveling support, said rear swiveling support pivotally connecting the seat carrier to the longitudinal adjustment device.

9. The seat frame of claim 1, wherein the mentioned one position of adjustment of the adjustment device is situated in a region that extends from a middle position of said adjustment device toward a lower setting of the front edge of the seat.

10. The seat frame of claim 1, wherein the side part has a bearing member means for a pivotal locking member of the device for adjusting the angular position.

11. The seat frame of claim 10, wherein the device for adjusting the angular position comprises a the pivotal locking member and a toothed quadrant arranged at the upper arm, which toothed cooperates with the locking member.

12. The seat frame of claim 2, wherein the two pairs of arms means are joined together by a tie bar.

13. The seat frame of claim 2, further comprising a left and a right rear swiveling support, said rear swiveling supports pivotally connecting the seat carrier to the longitudinal adjustment devices.

* * * * *

UNITED STATES PATENT AND TRADEMARK OFFICE
CERTIFICATE OF CORRECTION

PATENT NO. : 6,749,169 B2
DATED : June 15, 2004
INVENTOR(S) : Burkhard Becker et al.

It is certified that error appears in the above-identified patent and that said Letters Patent is hereby corrected as shown below:

Column 1,
Line 60, replace "an" with -- on --.

Column 3,
Line 34, replace "23" with -- 20 --.
Line 52, replace "mans" with -- means --.

Column 4,
Line 44, replace "02" with -- 62 --.

Column 5,
Line 23, replace "68" with -- 66 --.

Column 6,
Line 50, delete "a".

Signed and Sealed this

Twelfth Day of July, 2005

JON W. DUDAS
*Director of the United States Patent and Trademark Office*